(12) United States Patent
Ohe et al.

(10) Patent No.: US 7,112,355 B2
(45) Date of Patent: *Sep. 26, 2006

(54) ACTIVE MATRIX TYPE LIQUID CRYSTAL DISPLAY APPARATUS

(75) Inventors: Masahito Ohe, Hitachi (JP); Katsumi Kondo, Hitachinaka (JP); Masuyuki Ota, Hitachinaka (JP)

(73) Assignee: Hitachi Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/002,137

(22) Filed: Dec. 3, 2004

(65) Prior Publication Data

US 2005/0084623 A1  Apr. 21, 2005

Related U.S. Application Data

(63) Continuation of application No. 10/437,914, filed on May 15, 2003, now Pat. No. 6,849,309, which is a continuation of application No. 09/352,951, filed on Jul. 14, 1999, now Pat. No. 6,830,787, which is a continuation of application No. 08/405,887, filed on Mar. 17, 1995, now Pat. No. 6,011,606.

(30) Foreign Application Priority Data

Mar. 17, 1994  (JP) .................................. 6-46807
Mar. 17, 1994  (JP) .................................. 6-46808

(51) Int. Cl.
*C09K 19/52* (2006.01)
*G02F 1/1343* (2006.01)

(52) U.S. Cl. .................. 428/1.1; 252/299.01; 349/139; 349/143; 349/144; 349/147; 349/167

(58) Field of Classification Search ................. 428/1.1, 428/1.3; 252/299.5, 299.01; 349/139, 143, 349/144, 147, 167
See application file for complete search history.

(56) References Cited

U.S. PATENT DOCUMENTS 3,807,831 A  4/1974  Soref
3,960,748 A  6/1976  Klanderman et al.
4,181,563 A  1/1980  Miyaka et al.

(Continued)

FOREIGN PATENT DOCUMENTS

EP        0429662    *  6/1991

(Continued)

*Primary Examiner*—Shean C Wu
(74) *Attorney, Agent, or Firm*—Antonelli, Terry, Stout and Kraus, LLP.

(57) ABSTRACT

An active matrix type liquid crystal display apparatus having a pair of substrates, a liquid crystal layer between the substrates, an orientation film a scanning signal electrode, an image signal electrode, a pixel electrode and an active device. Each of the electrodes is arranged so as to apply an electric field, mainly parallel to the substrates. At least one of the electrodes is disposed between at least two dielectric layers disposed above and below the at least one of the electrodes. The resistivity of the liquid crystal layer is set at a value sufficient to substantially prevent disturbance of the orientation of the liquid crystal layer due to static electricity.

5 Claims, 10 Drawing Sheets

U.S. PATENT DOCUMENTS

| | | |
|---|---|---|
| 4,345,249 A | 8/1982 | Togashi |
| 4,506,956 A | 3/1985 | Dir |
| 5,283,676 A | 2/1994 | Borah et al. |
| 5,286,410 A | 2/1994 | Weber et al. |
| 5,498,365 A | 3/1996 | Nolan et al. |
| 5,578,241 A | 11/1996 | Plach et al. |
| 5,600,464 A | 2/1997 | Ohe et al. |
| 5,698,134 A | 12/1997 | Jubb et al. |
| 5,737,051 A | 4/1998 | Kondo et al. |
| 5,831,701 A | 11/1998 | Matsuyama et al. |
| 5,870,160 A | 2/1999 | Yanagawa et al. |
| 5,871,665 A | 2/1999 | Coates et al. |
| 5,891,360 A | 4/1999 | Wachtler et al. |
| 5,948,319 A | 9/1999 | Tanaka et al. |
| 6,011,606 A | 1/2000 | Ohe et al. |
| 6,830,787 B1 * | 12/2004 | Ohe et al. .............. 428/1.1 |
| 6,849,309 B1 * | 2/2005 | Ohe et al. .............. 428/1.1 |

FOREIGN PATENT DOCUMENTS

| | | |
|---|---|---|
| JP | 63-21907 | 5/1988 |
| WO | 91 19836 | 7/1991 |

* cited by examiner

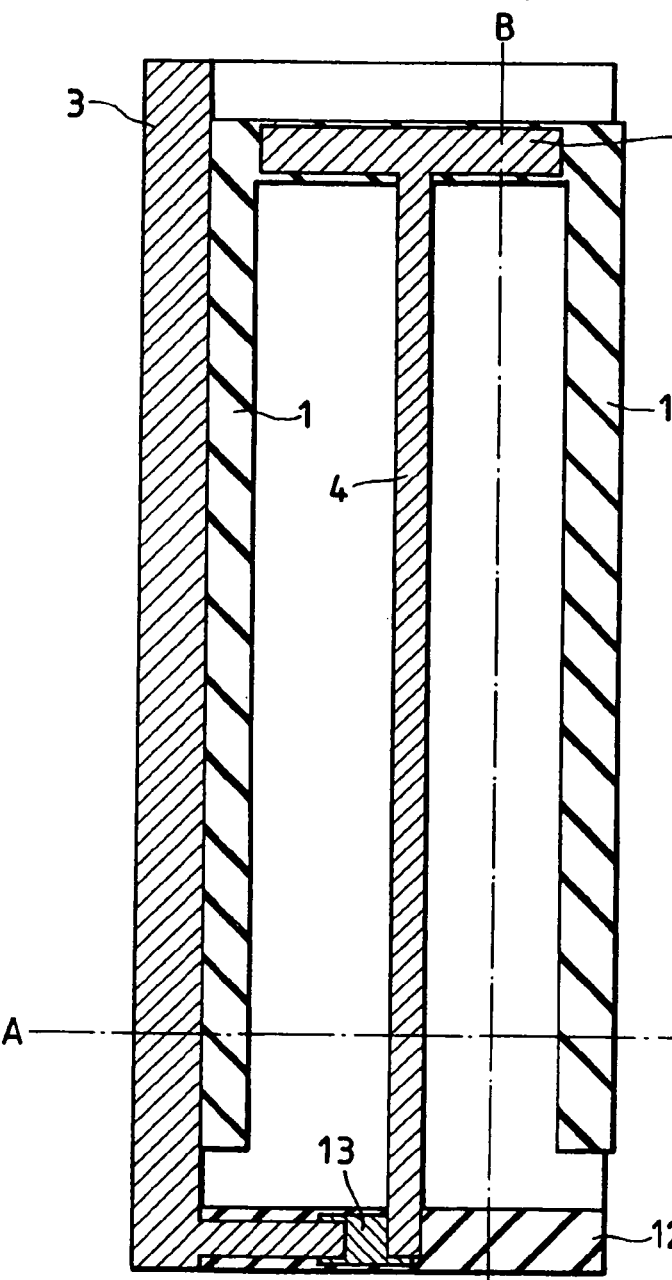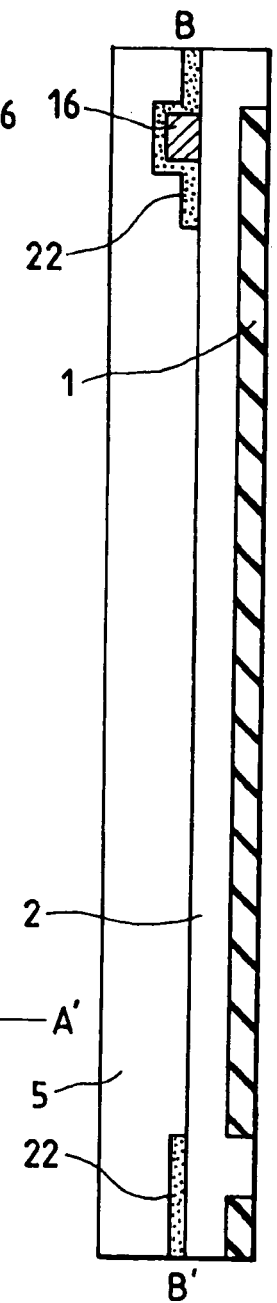
FIG. 3(a)  FIG. 3(c)  FIG. 3(b)

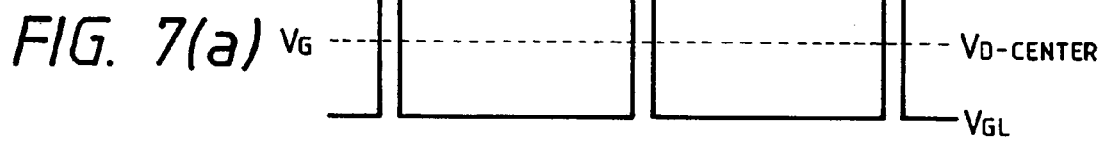
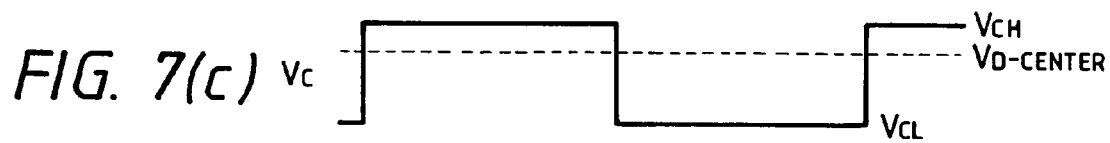
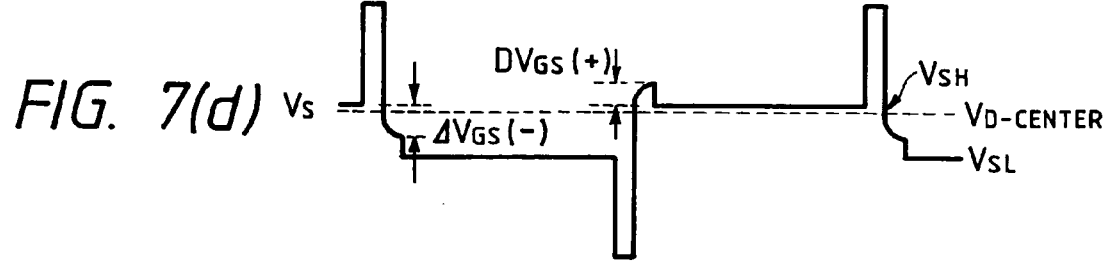
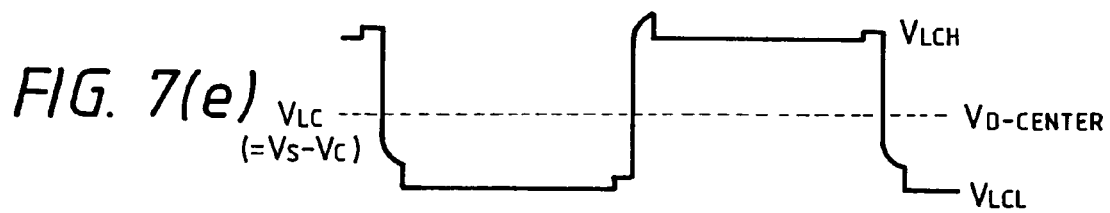

ACTIVE MATRIX TYPE LIQUID CRYSTAL DISPLAY APPARATUS

CROSS REFERENCE TO RELATED APPLICATIONS

This is a continuation of U.S. application Ser. No. 10/437,914, filed May 15, 2003, now U.S. Pat. No. 6,849,309, which is a continuation of U.S. application Ser. No. 09/352,951, filed Jul. 14,1999, now U.S. Pat. No. 6,830,787, which is a continuation of U.S. application Ser. No. 08/405,887, filed Mar. 17, 1995, now U.S. Pat. No. 6,011,606, the subject matter of which is incorporated by reference herein and is related to U.S. application Ser. No. 09/437,301, filed Nov. 19, 1999, now abandoned, which is also a continuation of the aforementioned U.S. application Ser. No. 08/405,887.

BACKGROUND OF THE INVENTION

The present invention relates to an active matrix type liquid crystal display apparatus, in which an electric field is applied, mainly parallel to the substrates, and in which a broad visual field and a large numerical aperture are realized.

In a conventional liquid crystal display apparatus, the electrodes for driving the liquid crystal layer are formed on the surface of two substrates, and transparent electrodes are used, the electrodes facing each other. This is because what is used is a twisted nematic display method (TN method) in which the liquid crystal layer is driven by applying an electric field in a direction vertical to the surface of the substrate. On the other hand, a display method in which an electric field is applied in a direction almost parallel to the surface of the substrate using comb-type electrodes has been disclosed in the Japanese Patent publication No. 63-21907 (1988) and U.S. Pat. No. 4,345,249. In this case, the electrodes are not necessarily selected to be transparent, but non-transparent and metallic electrodes with a higher electric conductivity are used. However, in the above-mentioned prior art, for the display method in which the electric field is applied in a direction substantially parallel to the surface of the electrode, which is designated as a "horizontal electric field method", specifically used in the active matrix drive mode, the material property required to realize a high numerical aperture is not described in detail.

In the conventional active matrix type liquid crystal display apparatus, typically using the twisted nematic method, a transparent electrode is used. It is, therefore, possible to make the numerical aperture relatively wide, which is the area that the light per unit pixel passes through. However, in the horizontal electric field method, an opaque metal electrode is used. It is, therefore, impossible to realize a large numerical aperture. In this regard, there is an essential problem in that the opaque portion of the electrode can not be used as part of the area that light passes through. Further, the brightness of the display apparatus also depends upon the magnitude of the numerical aperture. Even if the intensity of the background light is increased in an effort to alleviate this problem, the problem arises that the power consumption is increased extremely.

Accordingly, in order to realize a large numerical aperture when employing the horizontal electric field method, it is necessary to enlarge the gap between the electrodes. However a new problem arises due to the enlargement of the gap. First, a disturbance of the orientation occurs due to static electricity, because the volume of the liquid crystal decreases further. Generally, the electrode in the horizontal electric field method is different in configuration from the one in the other type. Therefore, the volume of the liquid crystal is not so large. If the volume becomes smaller by enlarging the gap between the electrodes, the liquid crystal is susceptible to the effects of static electricity. As a result, the disturbance of the orientation due to static electricity increases. Secondly, if the gap between the electrodes becomes large, a problem arises in that the display method driven by the electric field requires a large drive voltage.

SUMMARY OF THE INVENTION

An object of the present invention is to provide an active matrix type liquid crystal display apparatus using the horizontal electric field method, in which a broad visual field and a large numerical aperture are realized.

In the present invention, the following features are used for solving the above mentioned problems and attaining the above objective.

According to a first aspect of the present invention, the present invention comprises a pair of substrates, at least one of which is transparent; a liquid crystal layer inserted between the substrates; an orientation film provided between the liquid crystal layer and at least one of the pair of substrates and on an inner side of said at least one substrate; a scanning signal electrode, an image signal electrode, a pixel electrode and an active device, each provided between the liquid crystal layer and the at least one substrate; and polarization means provided on the outer side of the substrates, for changing a optical characteristic according to an orientation state of the liquid crystal; each of said electrodes being constructed so as to apply an electric field, mainly parallel to said substrates, against said liquid crystal layer, and being connected to an external control means for controlling optionally the applied electric field according to the display pattern; wherein said electrode lies between at least two dielectric layers disposed above and below the electrode, and wherein the resistivity of said liquid crystal is higher than or equal to $1 \times 10^9$ Ω·cm and lower than or equal to $1 \times 10^{13}$ Ω·cm.

According to a second aspect of the present invention, the present invention comprises a pair of substrates, at least one of which is transparent; a liquid crystal layer inserted between the substrates; an orientation film provided between the liquid crystal and at least one of the pair of substrates and on an inner side of said at least one substrate; a scanning signal electrode, an image signal electrode, a pixel electrode and an active device, each provided between the liquid crystal layer and the at least one substrate; and polarization means provided on the outer side of the substrates, for changing a optical characteristic according to an orientation state of the liquid crystal; each of said electrodes being constructed so as to apply an electric field, mainly parallel to said substrates, against said liquid crystal layer, and being connected to an external control means for controlling optionally the applied electric field according to the display pattern; wherein a ratio 1/d of a gap 1 between said electrodes to a cell gap d is greater than or equal to 2.0, and the relation between an elasticity constant $K_2$ and a dielectric anisotropy $\Delta \in$ satisfies the following equation (1):

$$K_2/\Delta \in < 9.0 \times 10^{-8} [dyn], \qquad (1).$$

According to a third aspect of the present invention, in the arrangement of the second aspect, the gap between the substrates facing each other is made to be less than or equal to 6 mm, the gap between the electrodes is made to be more than or equal to 10 mm, and the drive voltage is made to be lower than or equal to 5V.

According to a fourth aspect of the present invention, in the arrangement of the first and second aspects, the liquid crystal composite material is made to include a liquid crystal chemical compound represented by a general chemical formula (I), in which a cyano group, trifluoromethyl group, trifluoromethoxyl group or nitro group is included as an end group:

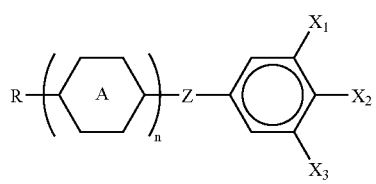

(In the formula (I), $X_1$, $X_2$ and $X_3$ are a fluoro group, cyano group, trifluoromethyl group, trifluoromethoxyl group, nitro group or hydrogen atom; R is an alkyl group or alkoxyl group having a carbon number 1 to 10 which can be substituted; Ring A is a cyclohexane ring, benzene ring, dioxane ring, pyrimidine ring, or [2, 2, 2]-bicyclohexane ring; Z is a single bonding, ester bonding, ether bonding, or methylene; or ethylene; and n is an integer, 1 or 2.)

According to a fifth aspect of the present invention, in the arrangement of the first and second aspects, the liquid crystal composite material is made to include a liquid crystal chemical compound represented by a general chemical formula (II), in which a cyano group, trifluoromethyl group, trifluoromethoxyl group, or nitro group is included in a transverse axis of the molecule of the liquid crystal chemical compound:

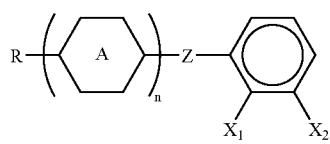

(In the formula (II), $X_1$ and $X_2$ are a fluoro group, cyano group, trifluoromethyl group, trifluoromethoxyl group, nitro group or hydrogen atom; R is an alkyl group or alkoxyl group having a carbon number 1 to 10 which can be substituted; Ring A is a cyclohexane ring, benzene ring, dioxane ring, pyrimidine ring, or [2, 2, 2]-bicyclohexane ring; Z is a single bonding, ester bonding, ether bonding, or methylene, or ethylene; and n is an integer 1 or 2.)

According to a sixth aspect of the present invention, in the arrangement of the first and second aspects, when the dielectric anisotropy of the liquid crystal is positive, the rubbing angle is set to an angle more than or equal to 1 degree and less than or equal to 20 degrees relative to the vertical direction of the electric field, and when the dielectric anisotropy of the liquid crystal is negative, the rubbing angle is set to an angle more than or equal to 1 degree and less than or equal to 10 degrees relative to the direction of the electric field.

According to a seventh aspect of the present invention, in the arrangement of the first and second aspects, the common electrode is composed of a part of the display pixels, and an alternating current is applied to the common electrode.

According to an eighth aspect of the present invention, in the arrangement of the first and second aspects, the transmission axis of said polarizer is set to an angle deviated more than or equal to 1 degree from an initial orientation direction of the liquid crystal to a rotation direction of the axis of the molecule of the liquid crystal due to the applied electric field.

FIG. 2 illustrates the angle $\phi_P$ defined by the polarization transmission axis, the angle $f_{LC}$ defined by the liquid crystal molecule longitudinal axis (optical axis) at the interface neighborhood, and the angle $\phi_R$ defined by the condensive axis in the phase shifter plate inserted between a couple of polarizers. The angle $\phi_P$ and $\phi_{LC}$ are expressed selectively in terms of $\phi_{P1}$, $\phi_{P2}$, $\phi_{LC1}$, and $\phi_{LC2}$ with regard to a couple of polarizers and a couple of liquid crystal interfaces.

FIGS. 1(a) and 1(b) show side cross-section views showing the operation of the liquid crystal in the liquid crystal panel, and FIGS. 1(c) and 1(d) show front views thereof in accordance with the present invention. In FIG. 1, active devices are not shown. In addition, though a plurality of pixels are formed with striped electrodes in accordance with the present invention, a partial view of a single pixel is shown. The side cross-section view when a voltage is not applied is shown in FIG. 1(a) and the front view is shown in FIG. 1(c). The linear electrodes 3 and 4 are formed inside a couple of transparent substrates 7, and a couple of orientation films 5 are coated on the substrates 7 so that they face each other. Liquid crystal composite material is inserted between the films. The liquid crystal molecule 6 shaped in line is oriented so that the angle $f_{LC}$ of the longitudinal axis of the molecule between the longitudinal direction of the Y electrode, shaped in the form of a stripe, may be maintained to be at an adequate angle, such as $45°<|\phi_{LC}|<90°$.

For the explanation below, the orientation directions of the liquid crystal molecule on each of the upper and lower interfaces are assumed to be parallel to each other, that is, $f_{LC1}=f_{LC2}$.

The dielectric anisotropy of the liquid crystal composite material is assumed to be positive. Next, when the electric field is applied, as shown in FIGS. 1(b) and 1(c), the axis of the liquid crystal molecule becomes oriented in the direction of the electric field. By placing the polarizer 8 on the polarization transmission axis, the optical transmission index can be modulated by applying and changing the electric field. Thus, a display operation for defining contrast is accomplished without transparent electrodes. Though the dielectric anisotropy of the liquid crystal composite material is assumed to be positive, it may be selected to be negative. In the case of a negative dielectric anisotropy, for the initial orientation of the liquid crystal molecule, the angle $f_{LC}$ is maintained at an adequate angle to the vertical direction with respect to the longitudinal axis of the striped electrode, such as $0°<|\phi_{LC}|45°$.

By providing the electrode between at least two dielectric layers disposed above and below the electrode, and by making the resistivity of the liquid crystal lower than or equal to $1\times10^{13}$ Ω·cm, as described in the first aspect, it is possible to increase the numerical aperture. The reason for this will be explained hereinafter. In generating the horizontal electric field, an opaque metal electrode is used. It is, therefore, impossible to realize a numerical aperture larger than the one of the prior art. The basic method of solving this problem is to enlarge the gap between the electrodes. However, a new problem may arise due to such enlargement of the gap. The disturbance of the orientation occurs due to static electricity, because the volume of the liquid crystal decreases further. To provide an auxiliary capacitance for each pixel brings about a deterioration of the numerical aperture. However, if the resistance of the liquid crystal is low, the disturbance of the orientation due to static electricity is small. Therefore, this provides a very effective solution. By this means, the domain around a spacer bead is also improved. In the conventional active matrix type liquid crystal display apparatus, it is required to use a liquid crystal with a high resistivity of at least $1\times10^{13}$ Ω·cm, preferably, $1\times10^{14}$ Ω·cm, in order to apply a sufficient voltage even during a non-selected period of time. In the horizontal electric field method the dielectric, except for the liquid crystal, such as a glass or other insulation film, acts to hold a capacitance to obtain the voltage hold ratio necessary for proper operation. By experiments, we found that even a liquid crystal with a resistivity of $1\times10^{10}$ Ω·cm has a high voltage hold ratio (frame frequency: 60 Hz) of more than 90%. However, compared to a conventional method, such as the TN method, the total capacitance, including the capacitance of the liquid crystal and the hold capacitance, is smaller in magnitude in the horizontal electric field method and is susceptible to the effect of static electricity. Not only the problem of static electricity, but also an increase in the drive voltage is brought about by an enlargement of the gap between the electrodes.

As for the means for reducing the drive voltage, it is found to be effective that, as described in connection with the second and third aspects, the relation between the dielectric anisotropy ($\Delta\in$) of the liquid crystal composite material and the elasticity constant ($K_2$) of the twist should satisfy the equation, $K_2/\Delta\in<9.0\times10^{-8}$[dyn]. As the thickness of the electrode is less than that of the liquid crystal composite material layer in the ordinary horizontal electric field method, it is impossible to apply an electric field which is completely parallel to the interface between the liquid crystal layer and the orientation layer onto the liquid crystal composite material layer. This insufficient horizontal electric field tends to cause a reduction in the efficiency of switching operation of the liquid crystal on the interface. By making the dielectric constant $\in_{LC}$ Of the liquid crystal layer larger than the dielectric constant $\in_{AF}$ of the orientation layer, preferably by making $\in_{LC}$ twice as large as $\in_{AF}$, a horizontal electric field which is more parallel to the interface between the liquid crystal and the orientation layer can be provided. With more intensive study in which the elasticity constant $K_2$ of the twist is modified to be smaller, or the dielectric anisotropy of the liquid crystal is modified to be larger, when the ratio between the elasticity constant and the dielectric anisotropy is set to be $9.0\times10^{-8}$ [dyn], and more, preferably when this ratio is set to be $7.0\times10^{-8}$ [dyn], a voltage drive of 5V or less can be attained. A drive voltage of 5V means that it is possible to produce a display by using the 5V voltage-tightness of a signal voltage driver.

As described in connection with the fourth aspect, by using a liquid crystal chemical compound represented by a general chemical formula (I), in which a cyano group, trifluoromethyl group, trifluoromethoxyl group or nitro group is included as an end group, we obtained an effective liquid crystal with a large numerical aperture. Namely, by a decrease in the resistivity, the static electricity can be prevented, and at the same time the drive voltage can be decreased. The decreasing of the resistivity is further effective for a small viscosity necessary for high-speed response. The liquid crystal which can not increase its resistivity, such as cyano groups, can be used for the display apparatus, because liquid crystals with lower resistivity show a high voltage hold ratio in the horizontal electric field method. Therefore, the margin of the kind of the liquid crystal to be used remarkably increases.

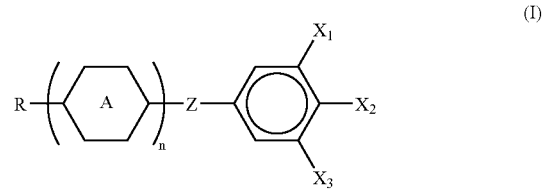

(In the formula (I), $X_1$, $X_2$ and $X_3$ are a fluoro group, cyano group, nitro group or hydrogen atom; R is an alkyl group or alkoxyl group having the carbon number 1 to 10 which can be substituted; Ring A is a cyclohexane ring, benzene ring, dioxane ring, pyrimidine ring, or [2, 2, 2]-bicyclooctane ring; Z is a single bonding, ester bonding, ether bonding, or methylene, or ethylene; and n is an integer 1 or 2.)

More concretely, there is suggested 1, 2-dicyano-4-[trans-4-(trans-4-propylcyclohexyl)cyclohexyl]benzene; Trans-4-propyl-(3, 4-dicyanobiphenyl-4'-yl)cyclohexane; 2-(trans-4-propylcyclohexyl)-1-[trans-4-(3, 4-dicyanophenyl) cyclohexyl]ethane; 3, 4-dicyanophenyl-trans-4-bentylcyclohexylcarboxylate; 4-cyano-3-fluorophenyl-trans-4-propylcyclohexylcarboxylate; trans-4-heptyl-(3, 5-difluoro-4-nitrophenyl)cyclohexane; 2, 6-difluoro-1-cyano-4-[trans-4-(trans-4-propylcyclohexyl)cyclohexyl]benzene; trans-4-propyl-(3, 4, 5-trifluorobiphenyl-4'-yl)cyclohexane; 2-(trans-4-propylcyclohexyl)-1-[trans-4-(3, 5-difluoro-4-nitrophenyl)cyclohexyl]ethane; 3, 5-difluoro-4-nitrophenyl-trans-4-bentylecyclohexylcarboxylate; trans-4-heptyl-(3-fluoro-4-cyanophenyl)cyclohexane; 2-fluoro-1-nitro-4-[trans-4(trans-4-propylcyclohexyl)cyclohexyl] benzene; trans-4-propyle-(3-fluoro-4-cyanobiphenyl-4'-yl) cyclohexane; 2-(trans-4-propylcyclohexyl)-1-[trans-4-(3-fluoro-4-nitrophenyl)cyclohexyl]ethane; 3-fluoro-4-cyanophenyl-trans-4-pentylecyclohexylcarboxylate; trans-4-heptyl-(4-cyanophenyl)cyclohexane; 4-cyanophenyl-5-bentyl-1, 3-pyrimidine; 4-cyano-3-fluorophenyl-5-propyl-1, 3-pyrimidine; 4-cyanophentl-4-pentyl-1, 3-dioxane; 4-cyanophenyl-4-pentyl-[2, 2, 2]-bicyclooctane. The present invention does not exclude compounds other than the above. The liquid crystal compound having a fluoro group at the ortho position in its cyano end group, represented by 4-cyano-3-fluorophenyl-trans-4-propylcyclohexylcarboxylate, is known to be a material which does not tend to form dimer to cancel the dipole momentum. As such liquid crystal compound has a larger dielectric constant and a lower viscosity, it is effective to apply this kind of compound to the high-speed driving operation in the horizontal electric field method.

When using a liquid crystal having a negative dielectric anisotropy, by including a liquid crystal chemical compound represented by a general chemical formula (II), in which a cyano group, trifluoromethyl group, trifluoromethoxyl group or nitro group is included as an end group, as described in connection with the fifth aspect, we obtained an effective liquid crystal with a large numerical aperture. Namely, by a decrease in the resistivity, the static electricity can be prevented, and at the same time the drive voltage can be decreased. The decreasing of the resistivity is further effective for a small viscosity necessary for high-speed response. The liquid crystal which can not increase its resistivity, such as the cyano groups, can be used for the display apparatus, because liquid crystals with a lower resistivity show a high voltage hold ratio in the horizontal electric field method. Therefore, the margin of the kind of liquid crystal to be used remarkably increases.

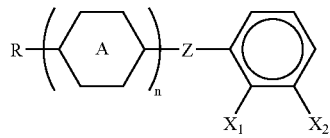

(II)

(In the formula (II), $X_1$ and $X_2$ are a fluoro group, cyano group, nitro group or hydrogen atom; R is an alkyl group or alkoxyl group having the carbon number 1 to 10 which can be substituted; Ring A is a cyclohexane ring, benzene ring, dioxane ring, pyrimidine ring, or [2, 2, 2]-bicyclooctane ring; Z is a single bonding, ester bonding, ether bonding, or methylene, or ethylene; and n is an integer 1 or 2.)

More particularly, there is inputted trans-4-heptyl-(2-cyano-3-fluorophenyl)cyclohexane; 2-cyano-3-fluoro-4-[trans-4(trans-4-propylcyclohexyl)cyclohexyl]benzene; Trans-4-propyl-(2-cyno-3-fluorobiphenyl-4'-yl)cyclohexane; 2-(trans-4-propylcyclohexyl)-1-[trans-4-(2-cyano-3-fluorophenyl)cyclohexyl]ethane; 2-cyano-3-fluorophenyl-trans-4-pentylecyclohexylcarboxylate; trans-4-heptyl-(2-fluoro-3-nitrophenyl)cyclohexane; 2-fluoro-3-cyano-4-[trans-4-(trans-4-propylcyclohexyl)cyclohexyl]benzene; trans-4-propyle-(2-fluoro-3-nitrobiphenyl-4'-yl)cyclohexane; 2-(trans-4-propylcyclohexyl)-1-[trans-4-(2-fluoro-3-nitrophenyl)cyclohexyl]ethane; 2-fluoro-3-cyanophenyl-trans-4-bentylecyclohexylcarboxylate; 2, 3-dicyanophenyl-5-pentyl-1, 3-pyrimidine; 2-cyano-3-fluorophenyl-5-propyl-1, 3-pylimidine; 2, 3-dicyanophenyl-4-pentyl-1, 3-dioxane; 2-cyano-3-fluorophenyl-4-pentyl[2, 2, 2]-bicyclooctane. The present invention does not exclude compounds other than the above.

As described in connection with the sixth aspect, when the dielectric anisotropy of the liquid crystal is positive, the rubbing angle is set to an angle more than or equal to 1 degree and less than or equal to 10 degrees relative to the vertical direction of the electric field, and when the dielectric anisotropy of the liquid crystal is negative, the rubbing angle is set to an angle more than or equal to 1 degree and less than or equal to 10 degrees relative to the direction of the electric field. This is another important way of reducing the drive voltage. As the angle between the axis of the molecule of the liquid crystal and the direction of the electric field becomes close to 90 degree, the voltage at the maximum transmission factor shifts to the low voltage side. Further, a non-select voltage can be set to the high voltage side, because the threshold voltage of the response to the electric field shifts to the high voltage side. Accordingly, it is possible to reduce the width of the drive voltage. FIG. 9 shows a typical example thereof, where it is desired that the rubbing angle is as small as possible, so long as any domains do not occur.

Further, it is possible to reduce further the drive voltage, by applying an alternating current to the common electrode, as described in connection with the seventh aspect, after the above sixth aspect was carried out.

Furthermore, we found that the eighth aspect is also effective to reduce the width of the drive voltage, as shown in FIG. 10, in which the transmission axis of a polarizing plate is deviated more than 1 degree from the initial orientation direction.

BRIEF DESCRIPTION OF THE DRAWINGS

FIGS. 3(a)–3(c) are views showing an example of an electrode configuration in a unit pixel of the liquid crystal display apparatus.

FIGS. 7(a)–7(e) are examples of the waveform diagrams of alternating current applied to the common electrode.

DETAILED DESCRIPTION OF THE PREFERRED EMBODIMENTS

Figure 1A:
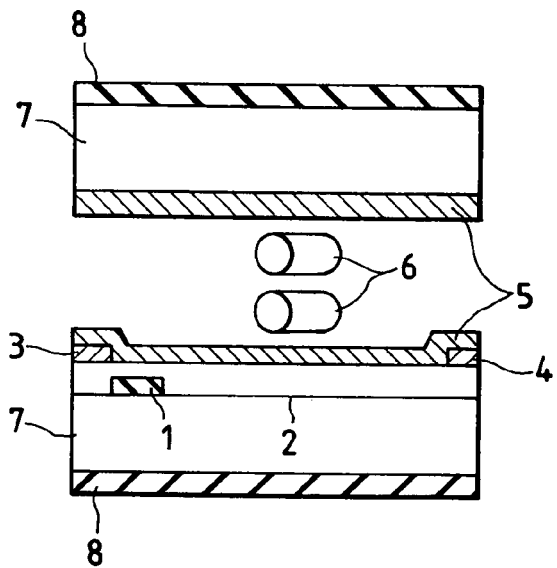
FIG. 1 is a view illustrating the operation of the liquid crystal using the horizontal electric field method.
Figure 1B:
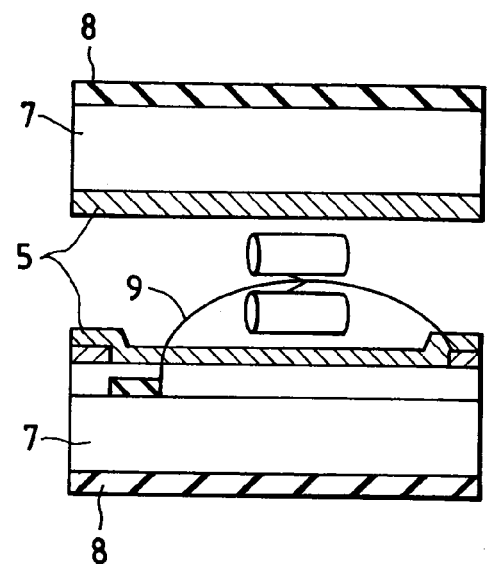
Figure 1C:
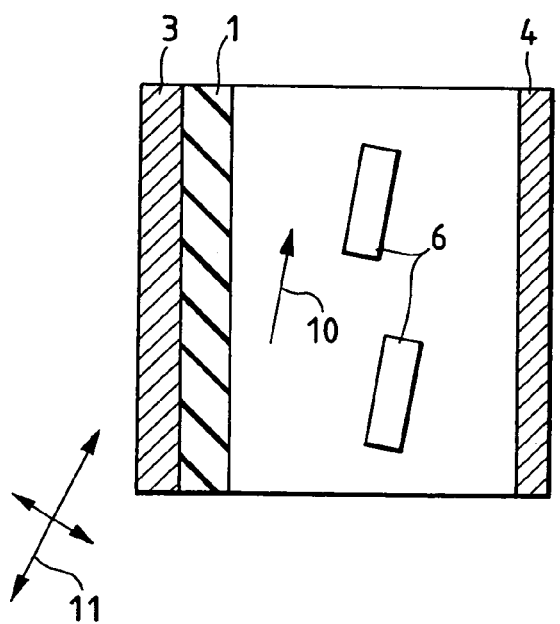
Figure 1D:
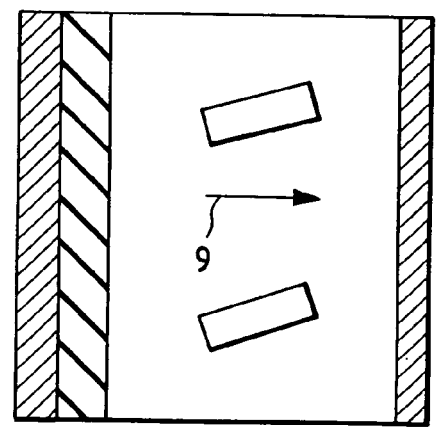
Figure 2:
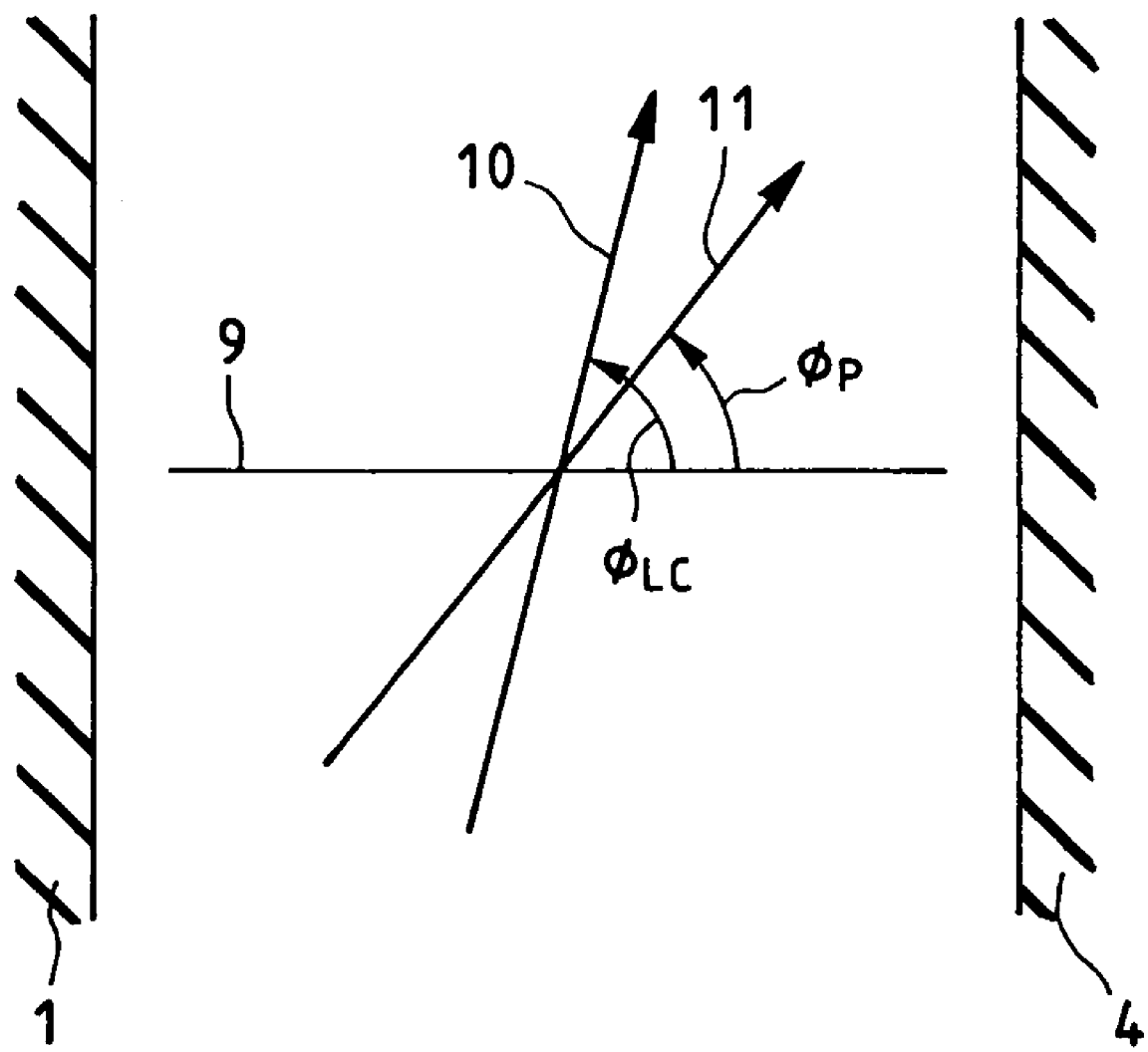
FIG. 2 is a diagram illustrating the definition of the rubbing direction and the axis direction of a polarizer.

The embodiments of the present invention will be explained in detail.

[Embodiment 1]

Two transparent glass substrates are used, each being 1.1 mm in thickness and having a surface which is polished. After forming thin film transistors on one of the substrates, an orientation film is formed on them, which also acts as an insulation film. Polyamide is used as the orientation film in this embodiment. A rubbing-processing is performed on the polyamide film in order to orient the liquid crystal. The polyamide and rubbing processings are performed also on the other substrate. The individual rubbing directions of a pair of substrates are parallel to each other, and have an angle 75° ($\Omega_{LC1}=\Omega_{LC2}=75°$) with respect to the direction in which the applied electric field is extended. A nematic liquid crystal composite is sandwiched by these substrates, of which the dielectric constant anisotropy $\Delta\in$ is +7.3 and the refractive index anisotropy $\Delta n$ is 0.074 (589 nm, 20°). A gap d is provided by distributing polymer beads between the substrates, and the size of gap is 4.0 μm. Thus, d·$\Delta n$ is 0.296 μm. The panel is sandwiched by a pair of polarizers (G1220DU, made by Nitto Electric Co.), and the polarization transmission axis of one polarizer is set to $\phi_{P1}=75°$, while the polarization transmission axis of the other polarizer is set to intersect perpendicularly with the former polarization transmission axis, which means $\in_{P2}=-15°$. With this geometrical configuration, the normally-close characteristic of the display pixel can be established, that is, the display pixel is in a dark state at a low voltage ($V_{OFF}$), and is in a bright state at a high voltage ($V_{ON}$).

FIGS. 3(a) to 3(c) show the configurations of a thin film transistor and all kinds of electrodes. FIG. 3(a) is a front view seen from the direction perpendicular to the surface of the substrate. FIG. 3(b) and FIG. 3(c) are sectional side elevations. The thin film transistor 14 comprises a pixel electrode (source electrode) 4, a signal electrode (drain electrode) 3, scanning electrode (gate electrode) 12, and amorphous silicone 13. Common electrodes 1 and the scanning electrode 12, and the signal electrode 3 and the pixel electrode 4, respectively, are a part of the pattern made by the same metal layer. A capacitor 16 is formed by sandwiching a gate insulation film 2 with the pixel electrode 4 and the common electrodes 1 at an area (shown by the dotted line in FIG. 1) between two common electrodes. In FIG. 3(a), the pixel electrode is disposed between two common electrodes. The pitch of the pixel electrode is 69 µm in a horizontal direction, i.e. between signal wiring electrodes, and 207 µm in a vertical direction, i.e. between scanning wiring electrodes. The width of the electrode is taken widely in order to avoid a wiring defect, in the wiring electrode extending over a plurality of electrodes, the scanning electrode, the signal electrode, or the common electrode wiring portion (the portion extending in a horizontal direction in FIG. 3 parallel to the scanning wiring electrode). More concretely, the width of the electrode is taken to be 10 µm. The width of the electrode is a little bit narrower in order to increase the numerical aperture in the pixel electrode formed independently for every pixel and the longitudinally extending portion of the signal wiring electrode of the common electrode. More concretely, the width of the electrode is taken to be 5 µm and 8 µm, respectively. The possibility of breaking of a wire will become higher because the width of the electrode was decreased. However, the breaking of a wire results in a partial defect, and does not result in a line defect. In addition, in order to increase the numerical aperture as high as possible, a portion of the common electrode and a portion of the signal electrode are provided one above the other, with an insulation film being inserted between those electrodes, and the width of the superposed portion is 1 µm. Thereby, it is not necessary to provide a black matrix parallel to the signal wiring. As a result, the present invention adopts a black matrix configuration, as shown in FIG. 3(c), in which only light in the direction of the scanning wiring electrode is prevented. As a result, a 44.0% high numerical aperture is obtained, in which the gap between the common electrode and the pixel electrode is 20 µm, the length in the longitudinal direction of the opening is 157 µm, and the number of pixels formed by 320 signal wiring electrodes and 160 wiring electrodes is 320×160.

The resistivity of the liquid crystal is $7.6 \times 10^{12}$, and undesirable conditions of orientation due to static electricity do not occur. An active matrix type liquid crystal display apparatus, having both a broad visual field and a large numerical aperture, is established, in which an inversion of gradation does not occur over more than 60 degrees in the up and down direction, and more than 60 degrees in the right and left direction.

[Embodiment 2]

The structure in the embodiment 2 is identical to that of the embodiment 1 except for the following features.

The material used for the liquid crystal compound is prepared by adding 5 weight % of 4-cyano-3-fluorophenyl-trans-4-propylcyclohexylcarboxylate into the liquid crystal of the embodiment 1. The weight % represents hereinafter the ratio to the total weight.

The resistivity of the liquid crystal is $7.6 \times 10^{12}$ Ω·cm, and undesirable conditions of orientation due to static electricity do not occur. An active matrix type liquid crystal display apparatus, having both a broad visual field and a large numerical aperture, is established, in which an inversion of gradation does not occur over more than 60 degrees in the up and down direction, and more than 60 degrees in the right and left direction.

[Embodiment 3]

The structure in the embodiment 3 is identical to that of the embodiment 1 except for the following features.

The material used for the liquid crystal compound is prepared by adding a 7 weight % of 3, 4-dicyanophenyl-trans-4-bentylcyclocarboxylate into the liquid crystal composite of the embodiment 1.

The resistivity of the liquid crystal is $3.3 \times 10^{11}$ Ω·cm, and the undesirable conditions of orientation due to static electricity do not occur. As a result, an active matrix type liquid crystal display apparatus, having both a broad visual field and a large numerical aperture, is established, in which an inversion of gradation does not occur over more than 60 degrees in the up and down direction, and more than 60 degrees in the right and left direction.

[Embodiment 4]

The structure in the embodiment 4 is identical to that of the embodiment 1 except for the following features.

The material used for the liquid crystal compound is prepared by adding 10 weight % of 4-trifluoromethoxyl-3, 5-difluorophenyl-trans-4-bentylcyclohexylcalboxylate into the liquid crystal compound having 4-cyano-3-fluorophenyl-trans-4-ethylphenylcarboxylate, 1-[4-(3, 4, 5-trifluorophenyl) cyclohexyl]-2-(4-methylcyclohexyl) ethane, 4-cyano-3-fluorophenyl-4-(4-propylcyclohexyl)phenylcarboxylate and so on as a representative compound.

The resistivity of the liquid crystal is $2.4 \times 10^{10}$ Ω·cm, and the undesirable conditions of orientation due to static electricity do not occur. The relation between the elasticity constant $K_2$ and the dielectric anisotropy $\Delta \in$, is made to be $8.5 \times 10^{-8}$ Ω·cm. Further, the drive voltage can be established to be 5V or less. As a result, an active matrix type liquid crystal display apparatus, having both a broad visual field and a large numerical aperture, is established, in which an inversion of gradation does not occur over more than 60 degrees in the up and down direction, and more than 60 degrees in the right and left direction.

[Embodiment 5]

The structure in the embodiment 5 is identical to that of the embodiment 1 except for the following features.

The material used for the liquid crystal compound is prepared by adding 20 weight % of 4-cyano-3, 5-difluorophenyl-trans-4-bentylcyclohexylcarboxylate into the liquid crystal compound having 4-cyano-3-fluorophenyl-trans-4-ethylphenylcarboxylate, 1-[4-(3, 4, 5-trifluorophenyl) cyclohexyl]-2-(4-methylcyclohexyl)ethane, 4-cyano-3-trifluoromethyl-5-fluorophenyl-4-(4-propylcyclohexyl) phenylcarboxylate and so on as a representative compound.

The resistivity of the liquid crystal is $9.3 \times 10^{9}$ Ω·cm, and the undesirable conditions of orientation due to static electricity do not occur. The relation between the elasticity constant $K_2$ and the dielectric anisotropy $\Delta \in$, is made to be $5.4 \times 10^{-8}$ Ω·cm. Further, the drive voltage can be established to be 5V or less. As a result, an active matrix type liquid crystal display apparatus, having both a broad visual field and a large numerical aperture, is established, in which an inversion of gradation does not occur over more than 60 degrees in the up and down direction, and more than 60 degrees in the right and left direction.

[Embodiment 6]

The structure in the embodiment 5 is identical to that of the embodiment 1 except for the following features.

Figure 4:
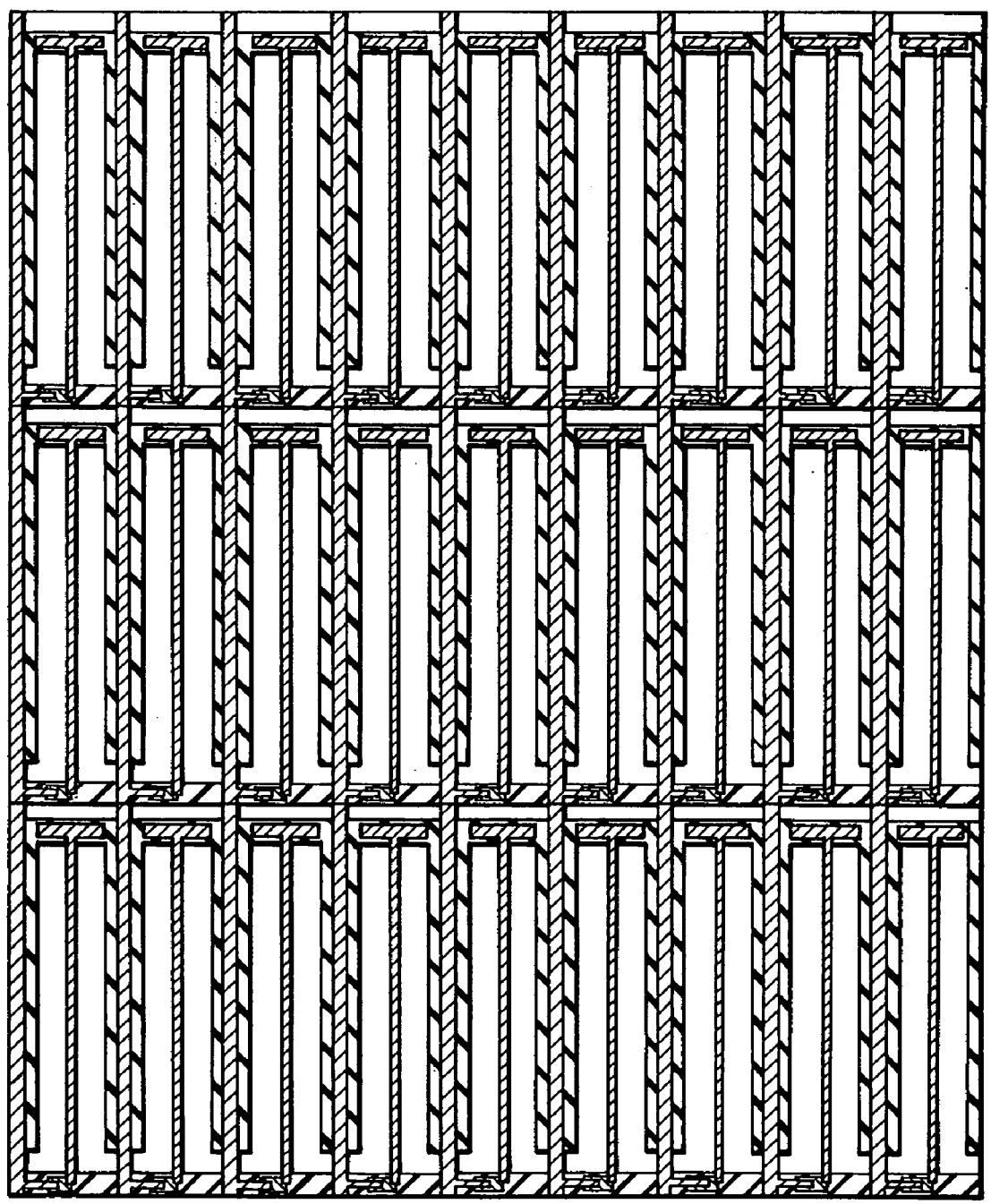
FIG. 4 is a sectional view showing another example of the electrode configuration in a unit pixel of the liquid crystal display apparatus.
Figure 5:
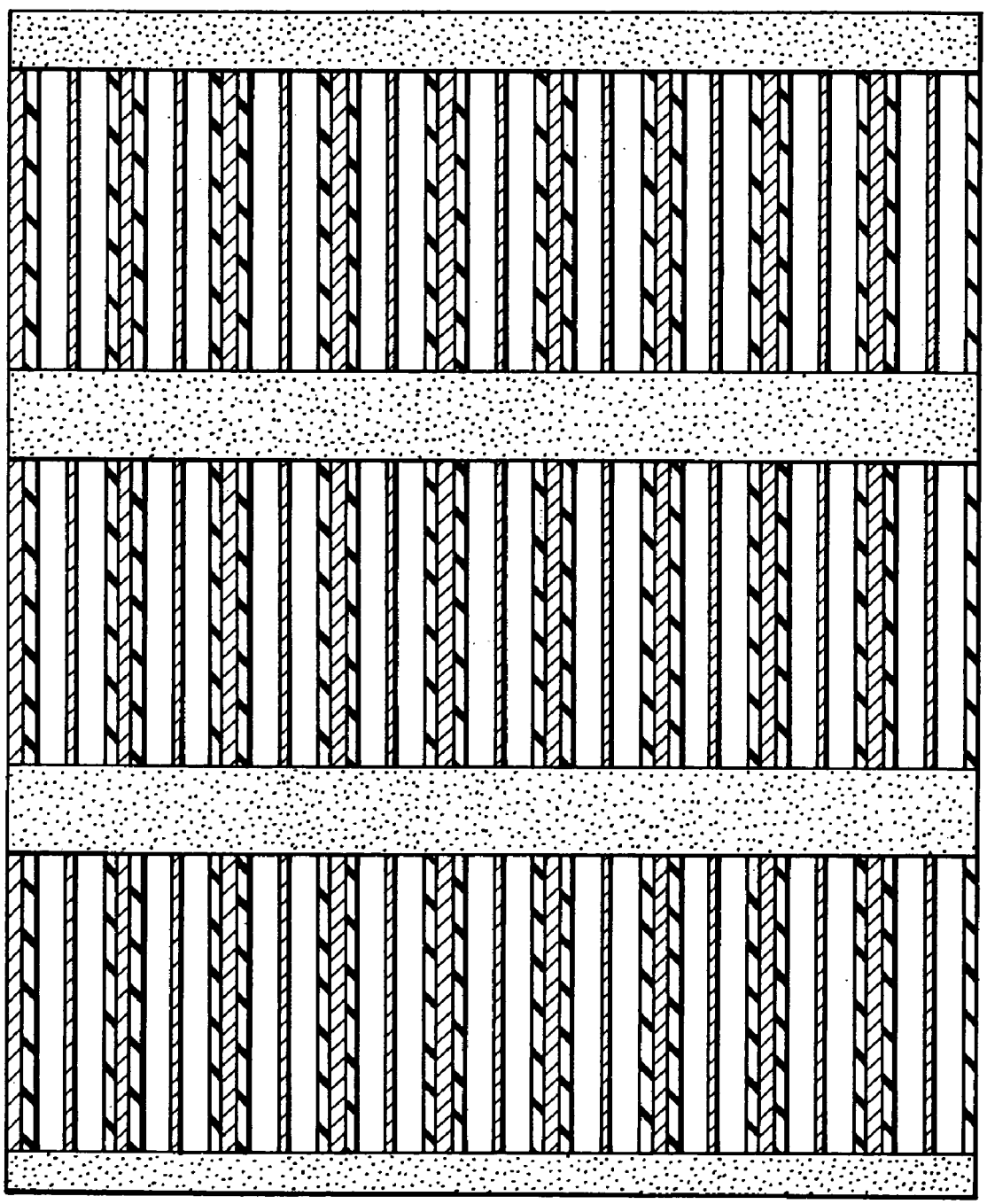
FIG. 5 is a sectional view of a typical example of the configuration of a color filter substrate.

FIG. 4 shows the configurations of a thin film transistor and all kinds of electrodes, in more detail, and represents a front view seen from the direction perpendicular to the surface of the substrate. The thin film transistor 14 comprises a pixel electrode (source electrode) 4, a signal electrode (drain electrode) 3, scanning electrode (gate electrode) 12, and amorphous silicone 13. Common electrodes 1 and the scanning electrode 12, and the signal electrode 3 and the pixel electrode 4, respectively, are a part of the pattern made by the same metal layer. A capacitor 16 is made by sandwiching a gate insulation film 2 with the pixel electrode 4 and the common electrodes 1 at an area (shown by the dotted line in FIG. 1) between two common electrodes. In the front view, the pixel electrode is disposed among three common electrodes 1. The pitch of the pixel electrode is 100 µm in a horizontal direction, i.e. between signal wiring electrodes, and 300 µm in a vertical direction, i.e. between scanning wiring electrodes. The width of the electrode is taken widely in order to avoid a wiring defect in the wiring electrode extending over a plurality of electrodes, the scanning electrode 12, the signal electrode 13, or the common electrode wiring portion (the portion extending in a horizontal direction in FIG. 3 parallel to the scanning wiring electrode). More concretely, the width of the electrodes are taken to be 10 µm, 8 µm and 8 µm, respectively. While, the width of the pixel electrode formed independently for every pixel and that of the longitudinally extending portion of the signal wiring electrode of the common electrode are a little bit narrower. More concretely, these widths are 5 µm and 6 µm, respectively. The possibility of breaking a wire becomes higher because the width of the electrode was decreased. However, the breaking of a wire results in a partial defect, and does not result in a line defect. In addition, the common electrode and the signal electrode are spaced by an insulation film, in which the spacing is 2 µm thick. A black matrix configuration and a color filter are provided in the opposite substrate side, as shown in FIG. 5. The gap between the common electrode and the pixel electrode is 20 µm, and the length in the longitudinal direction of the opening is 157 µm. As a result, the number of pixels formed by 640 signal wiring electrodes and 480 wiring electrodes is 320×160.

The nematic liquid crystal composite is sandwiched between the substrates, which includes 10 weight % of 3-cyano-4-trifluoro-methoxy-5-fluorophenyl-trans-4-ethyl-cyclohexylcarboxylate, and in which the dielectric anisotropy $\Delta \in$ is +8.9 and the refractive index anisotropy $\Delta n$ is 0.08 (589 nm, 20°).

The resistivity of the liquid crystal is $8.1 \times 10^{10}$ Ω·cm, and the undesirable conditions of orientation due to static electricity do not occur. As a result, an active matrix type liquid crystal display apparatus, having both a broad visual field and a large numerical aperture, is established, in which an inversion of gradation does not occur over more than 60 degrees in the up and down direction, and more than 60 degrees in the right and left direction.

[Embodiment 7]

The structure in the embodiment 7 is identical to that of the embodiment 6 except for the following features.

The material used for the liquid crystal compound is prepared by adding 10 weight % of 4-cyano-3, 5-difluorophenyl-trans-4-probylcyclohexylcarboxylate into the liquid crystal of the embodiment 6.

The resistivity of the liquid crystal is $2.2 \times 10^{10}$ Ω·cm, and undesirable conditions of orientation due to static electricity do not occur. The relation between the elasticity constant $K_2$ and the dielectric anisotropy $\Delta \in$ is made to be $4.6 \times 10^{-8}$ Ω·cm. Further, the drive voltage can be established to be 5V or less. As a result, an active matrix type liquid crystal display apparatus, having both a broad visual field and a large numerical aperture, is established, in which an inversion of gradation does not occur over more than 60 degrees in the up and down direction, and more than 60 degrees in the right and left direction.

[Embodiment 8]

The structure in the embodiment 8 is identical to that of the embodiment 6 except for the following features.

The material used for the liquid crystal compound is prepared by adding 20 weight % of 4-cyano-3, 5-difluorophenyl-trans-4-probylcyclohexylcalboxylate into the liquid crystal composite of the embodiment 6.

The resistivity of the liquid crystal is $6.2 \times 10^{10}$ Ω·cm, the undesirable conditions of orientation due to static electricity do not occur. The relation between the elasticity constant $K_2$ and the dielectric anisotropy, $\Delta \in$ is made to be $2.9 \times 10^{-8}$ Ω·cm. Further, the drive voltage can be established to be 5V or less. As a result, an active matrix type liquid crystal display apparatus, having both a broad visual field and a large numerical aperture, is established, in which an inversion of gradation does not occur over more than 60 degrees in the up and down direction, and more than 60 degrees in the right and left direction.

[Embodiment 9]

The structure in the embodiment 9 is identical to that of the embodiment 6 except for the following features.

The material used for the liquid crystal compound is prepared by adding 10 weight % of 3-cyano-4-trifluoromethoxy-5-fluorophenyl-trans-4-ethylcyclohexylcalboxylate into the liquid crystal composite of the embodiment 6.

The resistivity of the liquid crystal is $8.8 \times 10^{-9}$ Ω·cm, and undesirable conditions of orientation due to static electricity do not occur. The relation between the elasticity constant $K_2$ and the dielectric anisotropy $\Delta \in$ is made to be $2.3 \times 10^{-8}$ Ω·cm. Further, the drive voltage can be established to be 5V or less. As a result, an active matrix type liquid crystal display apparatus, having both a broad visual field and a large numerical aperture, is established, in which an inversion of gradation does not occur over more than 60 degrees in the up and down direction, and more than 60 degrees in the right and left direction.

[Embodiment 10]

The structure in the embodiment 10 is identical to that of the embodiment 1 except for the following features.

The individual rubbing directions of the orientation films of the pair of substrates are parallel to each other, and have an angle of 15° ($\phi_{LC1}=\phi_{LC2}=15°$) with respect to the direction in which the applied electric field is extended. A nematic liquid crystal composite is sandwiched by these substrates, of which the dielectric constant anisotropy $\Delta \in$ is −3.3 and the refractive index anisotropy $\Delta n$ is 0.074 (589 nm, 20°). The material used here is a liquid crystal compound in which 4 weight % of 3-cyano-2-fluorophenyl-trans-4-bentylcyclohexylcarboxylate is added to the nematic liquid crystal composite.

The resistivity of the liquid crystal is $8.6 \times 10^{11}$ Ω·cm, and undesirable conditions of orientation due to static electricity do not occur. As a result, an active matrix type liquid crystal display apparatus, having both a broad visual field and a large numerical aperture, is established, in which an inversion of gradation does not occur over more than 60 degrees in the up and down direction, and more than 60 degrees in the right and left direction.

[Embodiment 11]

The structure in the embodiment 11 is identical to that of the embodiment 6 except for the following features.

An 10 weight % of 2-(trans-4-propylcyclohexyl)-1-[trans-4-(2, 3-dicyanophenyl)cyclohexyl] ethane is added into a nematic liquid crystal composite, in which the dielectric constant anisotropy $\Delta \in$ is −3.3 and the refractive index anisotropy $\Delta n$ is 0.074 (589 nm, 20°).

The resistivity of the liquid crystal is $7.2 \times 10^{10}$ Ω·cm, and undesirable conditions of orientation due to static electricity do not occur. As a result, an active matrix type liquid crystal display apparatus, having both a broad visual field and a large numerical aperture, is established, in which a inversion of gradation does not occur over more than 60 degrees in the up and down direction, and more than 60 degrees in the right and left direction.

[Embodiment 12]

The structure in the embodiment 12 is identical to that of the embodiment 6 except for the following features.

The individual rubbing directions of a pair of substrates are parallel to each other, and have an angle of 85° ($\phi_{LC1}=\phi_{LC2}=85°$) with respect to the direction in which the applied electric field is extended. The polarization transmission axis of one polarizer is set to $\phi_{P1}=85°$, and the polarization transmission axis of the other polarizer is set to intersect perpendicularly with the former polarization transmission axis, which means $\phi_{P2}=-5°$. With this geometrical configuration, the normally-close characteristic of the display pixel can be established, that is, the display pixel is in a dark state at a low voltage ($VO_{OFF}$), and is in a bright state at a high voltage ($V_{ON}$).

Figure 11:
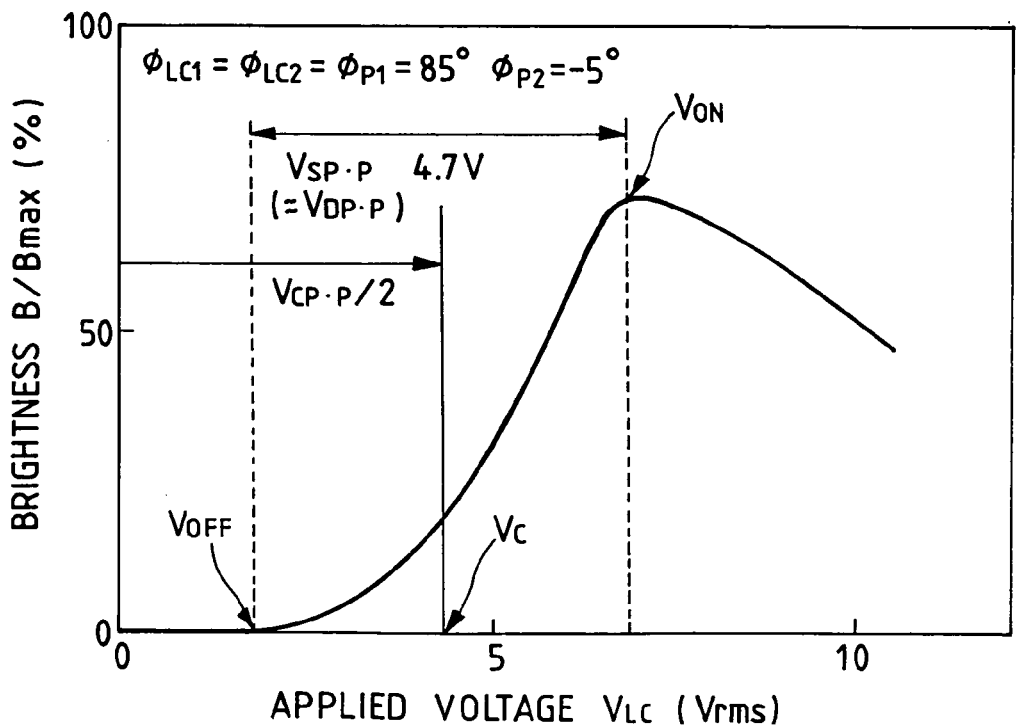
FIG. 11 is a graph showing a voltage-transmittance characteristic.

The voltage-transmittance characteristic of this active matrix type liquid crystal apparatus is as indicated in FIG. 11, in which $V_{OFF}$ can be set to 2.1 V and $V_{ON}$ can be set to 6.8 V. Therefore, the width of the drive voltage can be set to 4.7 V. As a result, an active matrix type liquid crystal display apparatus, having both a broad visual field and a large numerical aperture, is established, in which an inversion of gradation does not occur over more than 60 degrees in the up and down direction, and more than 60 degrees in the right and left direction.

[Embodiment 13]

The structure in the embodiment 13 is identical to that of the embodiment 11 except for the following features.

The individual rubbing directions of a pair of substrates are parallel to each other, and have an angle of 5° ($\phi_{LC1}=\phi_{LC2}=5°$) with respect to the direction in which the applied electric field is extended. The polarization transmission axis of one polarizer is set to $\phi_{P1}=5°$, and the polarization transmission axis of the other polarizer is set to intersect perpendicularly with the former polarization transmission axis, which means $\phi_{P2}=-85°$. With this geometrical configuration, the normally-close characteristic of the display pixel can be established, that is, the display pixel is in a dark state at a low voltage ($V_{OFF}$), and is in a bright state at a high voltage ($V_{ON}$).

The voltage-transmittance characteristic of this active matrix type liquid crystal apparatus is as indicated in FIG. 11, in which $V_{OFF}$ can be set to 4.0 V and $V_{ON}$ can be set to 8.8 V. Therefore, the width of the drive voltage can be set to 4.8 V. As a result, an active matrix type liquid crystal display apparatus, having both a broad visual field and a large numerical aperture, is established, in which an inversion of gradation does not occur over more than 60 degrees in the up and down direction, and more than 60 degrees in the right and left direction.

[Embodiment 14]

The structure in the embodiment 14 is identical to that of the embodiment 12 except for the following features.

Figure 6:
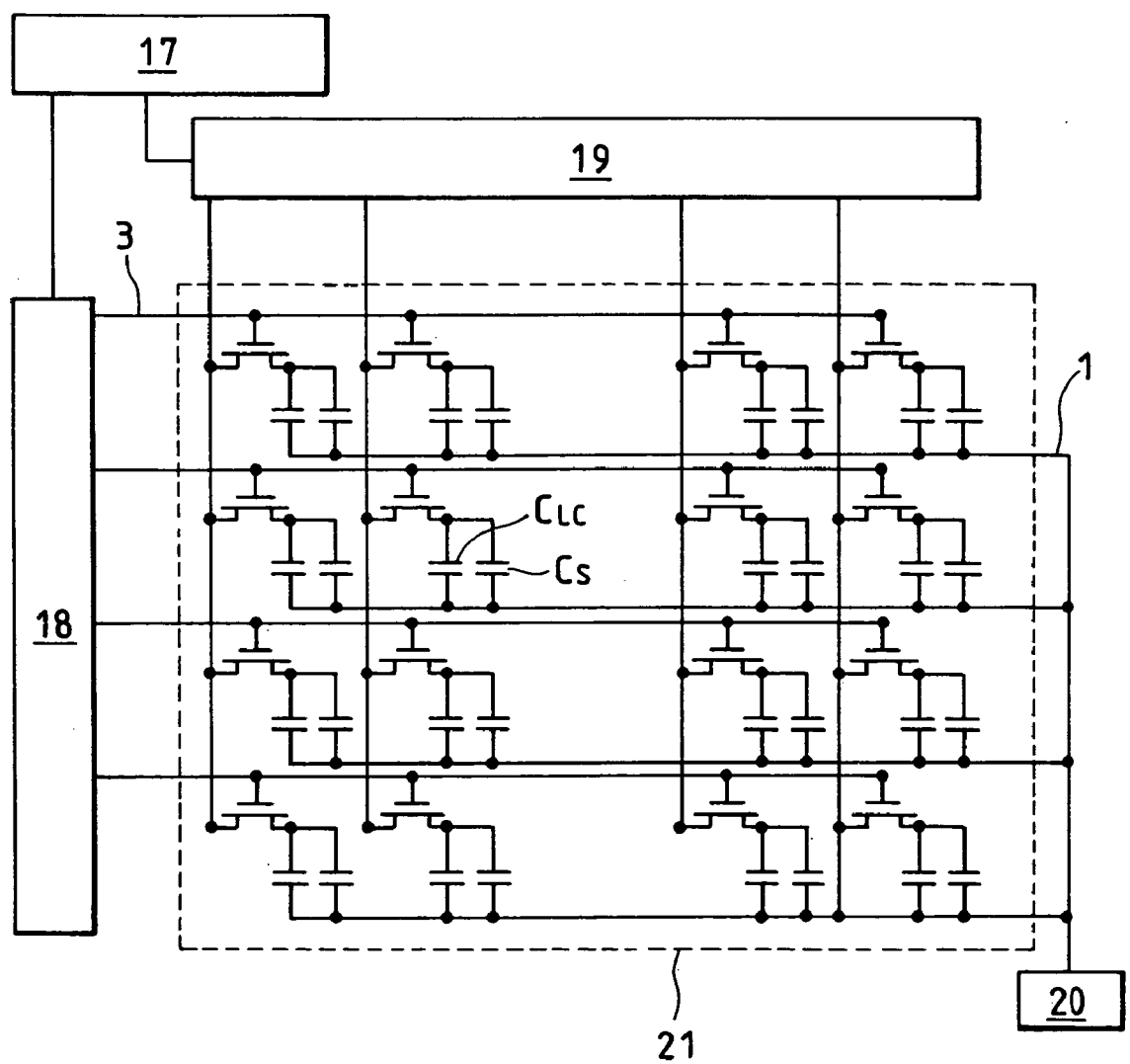
FIG. 6 is a schematic circuit diagram showing a TFT circuit in the liquid crystal display apparatus according to the present invention.
Figure 8:
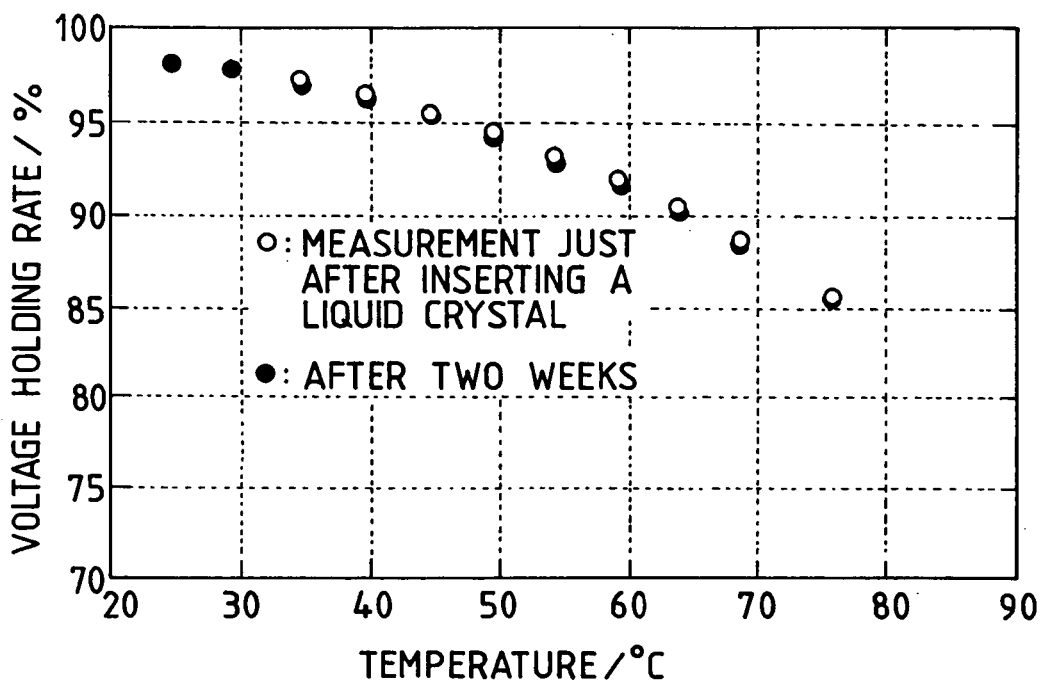
FIG. 8 is a graph showing the result of experiments on the voltage hold ratio in the liquid crystal display apparatus according to the present invention.
Figure 9:
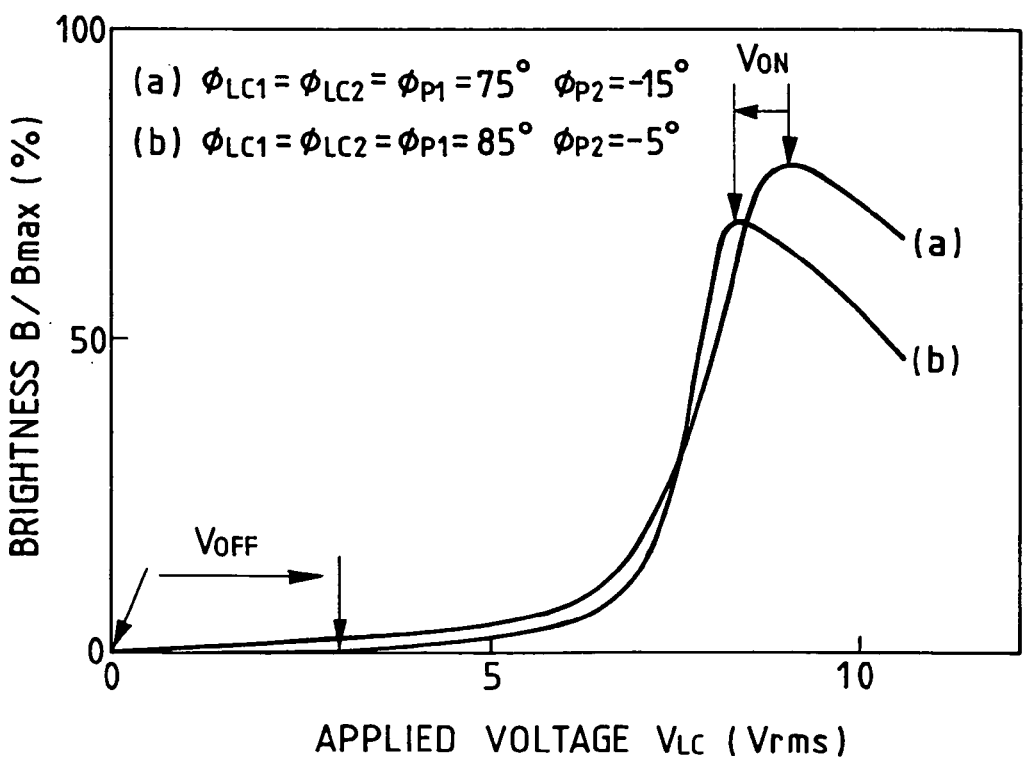
FIG. 9 is a graph showing the variation of the width of a drive voltage in a rubbing direction.
Figure 10:
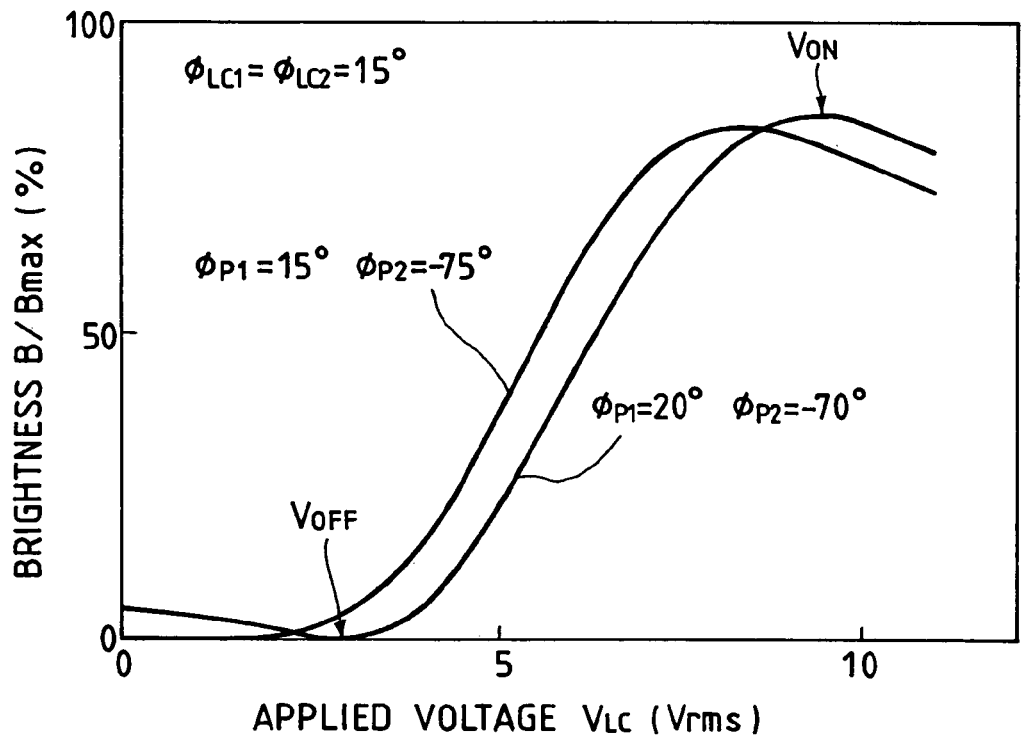
FIG. 10 is a graph showing the variation of the voltage-transmittance characteristic caused by the variation of the axis direction of a polarizer.

The common electrode is arranged according to the following, as seen in FIG. 6, in order to apply an alternating current thereto. Each scanning electrode 12 and each signal electrode 3 are connected to a scanning electrode drive circuit 18 and a signal electrode drive circuit 19, respectively. Further, the common electrode 1 is connected to a common electrode drive circuit 20. A signal waveform carrying information is applied to the signal electrode 3. A scanning waveform in synchronism with the signal waveform is applied to the scanning electrode 12. The information signal is transferred from the signal electrode 3 through a thin film transistor 14 to the pixel electrode 4, whereby the voltage produced between the pixel electrode and the common electrode 1 is applied to a portion of the liquid crystal. In the present invention, a voltage waveform is also applied to the common electrode. Therefore, a voltage including that of the common electrode is applied to the portion of the liquid crystal. FIG. 7 shows those voltage waveforms applied to each of the wiring electrodes, where the amplitudes of the voltage waveforms in FIG. 7 are set as follows.

$V_{D\text{-}CENTER}=14.0$ V, $V_{GH}=28.0$ V, $V_{GL}=0$ V, $V_{DH}=16.4$ V, $V_{DL}=11.4$ V, $V_{CH}=15.1$ V, $V_{CL}=9.1$ V.

The $V_{ON}$ and $V_{OFF}$ Of FIG. 11 are 2.1 volts and 6.8 volts, respectively. As a result, a higher contrast ratio of 150 is obtained. In FIG. 11, $V_{DP\text{-}P}$, $V_{SP\text{-}P}$, and $V_{CP\text{-}P}$, represent peak-to-peak values of the signal voltage, the source voltage, and the common voltage, respectively.

In the present embodiment, the amplitude of the drive voltage waveform $V_{DP\text{-}P}$ ($=V_{DH}-V_{DL}$) is a very low value, 4.7 volts, which is supplied to the signal wiring electrode. Accordingly, a relatively cheap driver can be used, and it becomes possible to reduce the production cost.

[Embodiment 15]

The structure in the embodiment 15 is identical to that of the embodiment 13 except for the following features.

In the same way as the Embodiment 14, an alternating current is applied to the common electrode, and the display apparatus is driven. Accordingly, a relatively cheap driver can be used, and it becomes possible to reduce the production cost.

[Embodiment 16]

The structure in the embodiment 16 is identical to that of the embodiment 14 except for the following features.

Figure 12:
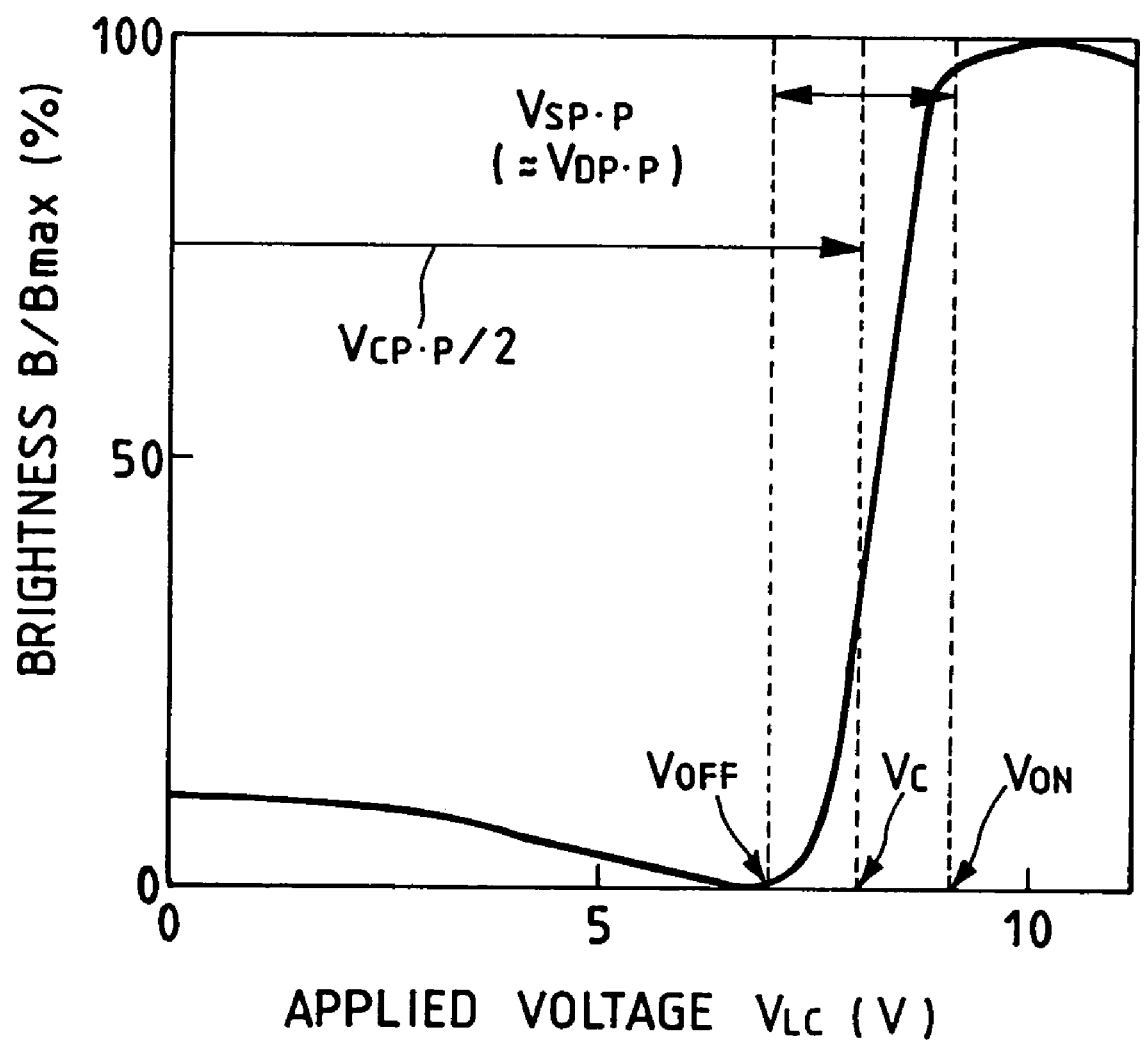
FIG. 12 is a graph showing a voltage-transmittance characteristic.

The transmission axis of the polarizer is set so as to have an angle of 10° with respect to the rubbing direction, namely, $\phi_{P1}=75°$ and $\phi_{P2}=-15°$. FIG. 12 shows the relationship between the voltage-transmittance characteristic and the drive waveform obtained in the above structure. In FIG. 12, $V_{DP\text{-}P}$, $V_{SP\text{-}P}$, and $V_{CP\text{-}P}$, represent peak-to-peak values of the signal voltage, the source voltage, and the common voltage.

The common electrode is arranged in the same way as the Embodiment 9, in order to apply an alternating current thereto. Each scanning electrode 12 and each signal electrode 3 are connected to a scanning electrode drive circuit 18 and a signal electrode drive circuit 19, respectively. Further, the common electrode 1 is connected to a common electrode drive circuit 20 (see FIG. 6). A signal waveform carrying information is applied to the signal electrode 3. A scanning waveform in synchronism with the signal waveform is applied to the scanning electrode 12. The information signal is transferred from the signal electrode 3 through a thin film transistor 14 to the pixel electrode 4, whereby the voltage produced between the pixel electrode and the common electrode 1 is applied to a portion of the liquid crystal. In the present invention, a voltage waveform is also applied to the common electrode. Therefore, a voltage including that of the common electrode is applied to the portion of the liquid crystal. FIG. 7 shows those voltage waveforms applied to each of the wiring electrodes, where the amplitudes of the voltage waveforms in FIG. 7 are set as follows.

$V_{D\text{-}CENTER}=14.0$ V, $V_{GH}=28.0$ V, $V_{GL}=0$ V, $V_{DH}=15.1$ V, $V_{DL}=12.9$ V, $V_{CH}=20.4$ V, $V_{CL}=4.39$ V.

As a result, the plunge voltage $\Delta V_{GS}(+1)$, $\Delta V_{GS}(-1)$ produced by the parasitic capacitance between the gate electrode and the source electrode, the voltage $V_S$ applied over the pixel electrode and the voltage $V_{LC}$ applied over the liquid crystal are shown in the following Table. The unit of voltage is hereinafter taken as a volt.

TABLE 1

| Display States | $\Delta V_{GS}$ (+) | $\Delta V_{GS}$ (−) | $V_{SH}$ | $V_{SL}$ | $V_{LCH}$ | $V_{LCL}$ | $V_{rms}$ |
|---|---|---|---|---|---|---|---|
| Brightness | +1.76 | −1.64 | +11.14 | −13.46 | +9.24 | −9.07 | 9.16 |
| Darkness | +1.47 | −1.57 | +13.63 | −11.33 | +6.75 | −6.94 | 6.85 |

The values of $V_{ON}$ and $V_{OFF}$ Of FIG. 12 are 9.16 volts and 6.85 volts, respectively. As a result, a sufficiently high contrast ratio of 100 is obtained.

In the present Embodiment, the amplitude of the drive voltage waveform $V_{DP\text{-}P}$ ($=V_{DH}-V_{DL}$) is a very low value, 2.2 volts, which is supplied to the signal wiring electrode.

[Embodiment 17]

The structure in the embodiment 17 is identical to that of the embodiment 15 except for the following features.

The transmission axis of the polarizer is set so as to have an angle of 10° with respect to the rubbing direction, namely, $\phi_{P1}=15°$ and $\phi_{P2}=-75°$. As a result, the values of $V_{ON}$ and $V_{OFF}$ are 17.4 volts and 14.2 volts, respectively. As a result, a sufficiently high contrast ratio of 100 is obtained.

In the present embodiment, the amplitude of the drive voltage waveform $V_{DP\text{-}P}$ ($=V_{DH}-V_{DL}$) is a very low value, 3.2 volts, which is supplied to the signal wiring electrode.

While in the embodiments of this invention, specific liquid crystal composites and its compounds are suggested, it will easily be understood that other liquid crystal composites and compounds can be used. The structure of a pixel is also not limited to that of the embodiments according to the present invention as described herein.

What is claimed is:

1. An active matrix type liquid crystal display apparatus comprising: a pair of substrates, at least one of which is transparent; a liquid crystal layer inserted between the substrates; an orientation film provided between the liquid crystal layer and at least one of the pair of substrates and on an inner side of said at least one substrate; a scanning signal electrode, an image signal electrode, a pixel electrode and an active device, each provided between the liquid crystal layer and said at least one substrate; and polarization means provided on the outer sides of the substrates, for changing an optical characteristic according to an orientation state of the liquid crystal layer; each of said electrodes being arranged so as to apply an electric field, mainly parallel to said substrates, to said liquid crystal layer, and being connected to an external control means for selectively controlling the electric field according to a display pattern;

wherein at least one of said electrodes is disposed between at least two dielectric layers disposed above and below the at least one of said electrodes, and wherein the resistivity of said liquid crystal layer is set at a value sufficient to substantially prevent disturbance of the orientation of said liquid crystal layer due to static electricity, the value of the resistivity of said liquid crystal layer being within a range of one of $1\times10^9$ $\Omega\cdot$cm to $2.4\times10^{10}$ $\Omega\cdot$cm and $6.2\times10^{10}$ $\Omega\cdot$cm to $1\times10^{13}$ $\Omega\cdot$cm.

2. An active matrix liquid crystal display apparatus according to claim 1, wherein a common electrode is provided as a part of a plurality of display pixels, and an alternating current is applied to the common electrode.

3. An active matrix type liquid crystal display apparatus comprising: a pair of substrates, at least one of which is transparent; a liquid crystal layer inserted between the substrates; an orientation film provided between the liquid crystal layer and at least one of the pair of substrates and on an inner side of said at least one substrate; a scanning signal electrode, an image signal electrode, a pixel electrode and an active device, each provided between the liquid crystal layer and said at least one substrate; and polarization means provided on the outer sides of the substrates, for changing an optical characteristic according to an orientation state of the liquid crystal layer; each of said electrodes being arranged so as to apply an electric field, mainly parallel to said substrates, to said liquid crystal layer, and being connected to an external control means for selectively controlling the electric field according to a display pattern;

wherein a ratio l/d of a gap l between said pixel electrode and a common electrode to a gap d between said pair of substrates is greater than or equal to 2.0.

4. An active matrix type liquid crystal display apparatus according to claim 3, wherein said common electrode is composed of a part of a plurality of display pixels, and an alternating current is applied to the common electrode.

5. An active matrix type liquid crystal display apparatus according to claim 2, wherein a relation between an elasticity constant $K_2$ and a dielectric anisotropy $\Delta\in$ satisfies the following equation (1):

$$K_2/\Delta\in < 9.0\times10^{-8} \qquad (1).$$

* * * * *